United States Patent [19]

Speciner

[11] Patent Number: 5,303,069
[45] Date of Patent: Apr. 12, 1994

[54] METHOD FOR PRODUCING A MULTITONE IMAGE

[75] Inventor: Michael Speciner, Acton, Mass.

[73] Assignee: Camex, Inc., Culver City, Calif.

[21] Appl. No.: 810,462

[22] Filed: Dec. 19, 1991

[51] Int. Cl.$^5$ .............................................. H04N 1/40
[52] U.S. Cl. .................................... 358/455; 358/448; 358/298
[58] Field of Search ............... 358/455, 75, 78, 448, 358/445; 364/520

[56] References Cited

U.S. PATENT DOCUMENTS 4,806,949  2/1989  Onuma et al. ................. 358/298
5,146,346  9/1992  Knoll ............................. 358/500

OTHER PUBLICATIONS

Robert Floyd and Louis Steinberg, "An Adoptive Algorithm for Spatial Grey Scale," Society for Information Display (SID) 75 Digest, pp. 36-37, 1975.

Thomas M. Holladay, "An Optimum Algorithm for Halftone Generation for Displays and Hard Copies," Proceedings of the SID, vol. 21/2, pp. 185-192, 1980.

Donald E. Knuth, "Digital Halftones by Dot Diffusion," ACM Transactions on Graphics, vol. 6, No. 4, pp. 245-273, Oct. 1987.

*Primary Examiner*—Mark R. Powell
*Assistant Examiner*—Madeleine Nguyen
*Attorney, Agent, or Firm*—Freilich Hornbaker Rosen

[57] ABSTRACT

The present invention relates to a method for producing multitone image data from data representative of an original image and, in particular, for producing multitone image data with a set of N output darkness levels U greater than 2 from original darkness values $V_o$ representative of an original image.

19 Claims, 6 Drawing Sheets

|   | j for Wy(i,j) = | 0 | 1 | 2 | 3 | 4 | 5 | 6 | 7 |
|---|---|---|---|---|---|---|---|---|---|
|   | j for Wm(i,j) = | 0 | 1 | 2 | 3 | 4 | 5 | 6 | 7 |
|   | j for Wc(i,j) = | 0 | 1 | 2 | 3 | 4 | 5 | 6 | 7 |
| 0 | | 1/16 | 9/16 | 3/16 | 11/16 | 5/16 | 13/16 | 7/16 | 15/16 |
| 1 | | 13/16 | 7/16 | 15/16 | 1/16 | 9/16 | 3/16 | 11/16 | 7/16 |
| 2 | | 3/16 | 11/16 | 5/16 | 13/16 | 7/16 | 15/16 | 1/16 | 9/16 |
| 3 | | 15/16 | 1/16 | 9/16 | 3/16 | 11/16 | 5/16 | 13/16 | 7/16 |
| 4 | | 5/16 | 13/16 | 7/16 | 15/16 | 1/16 | 9/16 | 3/16 | 11/16 |
| 5 | | 9/16 | 3/16 | 11/16 | 5/16 | 13/16 | 7/16 | 15/16 | 1/16 |
| 6 | | 7/16 | 15/16 | 1/16 | 9/16 | 3/16 | 11/16 | 5/16 | 13/16 |
| 7 | | 11/16 | 5/16 | 13/16 | 7/16 | 15/16 | 1/16 | 9/16 | 3/16 |

|   | t = j | | | | | | | |
|---|---|---|---|---|---|---|---|---|
|   | 0 | 1 | 2 | 3 | 4 | 5 | 6 | 7 |
| Co(s,t) →<br>Wc(i,j) →<br>Uc(i,j) →<br>Cr(i,j) → | .33<br>1/16<br>1<br>.25 | .33<br>9/16<br>1<br>.25 | .33<br>3/16<br>1<br>.25 | .33<br>11/16<br>2<br>.5 | .67<br>5/16<br>2<br>.5 | .67<br>13/16<br>3<br>.75 | .67<br>7/16<br>3<br>.75 | .67<br>15/16<br>3<br>.75 |
| 1 | .33<br>13/16<br>2<br>.5 | .33<br>7/16<br>1<br>.25 | .33<br>15/16<br>2<br>.5 | .33<br>1/16<br>1<br>.25 | .67<br>9/16<br>3<br>.75 | .67<br>3/16<br>2<br>.5 | .67<br>11/16<br>3<br>.75 | .67<br>5/16<br>2<br>.5 |
| 2 | .33<br>3/16<br>1<br>.25 | .33<br>11/16<br>2<br>.5 | .33<br>5/16<br>1<br>.25 | .33<br>13/16<br>2<br>.5 | .67<br>7/16<br>3<br>.75 | .67<br>15/16<br>3<br>.75 | .67<br>1/16<br>2<br>.5 | .67<br>9/16<br>3<br>.75 |
| 3 | .33<br>15/16<br>2<br>.5 | .33<br>1/16<br>1<br>.25 | .33<br>9/16<br>1<br>.25 | .33<br>3/16<br>1<br>.25 | .67<br>11/16<br>3<br>.75 | .67<br>5/16<br>2<br>.5 | .67<br>13/16<br>3<br>.75 | .67<br>7/16<br>3<br>.75 |
| 4 | 0<br>5/16<br>0<br>0 | 0<br>13/16<br>0<br>0 | 0<br>7/16<br>0<br>0 | 0<br>15/16<br>0<br>0 | .67<br>1/16<br>2<br>.5 | .67<br>9/16<br>3<br>.75 | .67<br>3/16<br>2<br>.5 | .67<br>11/16<br>3<br>.75 |
| 5 | 0<br>9/16<br>0<br>0 | 0<br>3/16<br>0<br>0 | 0<br>11/16<br>0<br>0 | 0<br>5/16<br>0<br>0 | .67<br>13/16<br>3<br>.75 | .67<br>7/16<br>3<br>.75 | .67<br>15/16<br>3<br>.75 | .67<br>1/16<br>2<br>.5 |
| 6 | 0<br>7/16<br>0<br>0 | 0<br>15/16<br>0<br>0 | 0<br>1/16<br>0<br>0 | 0<br>9/16<br>0<br>0 | .67<br>3/16<br>2<br>.5 | .67<br>11/16<br>3<br>.75 | .67<br>5/16<br>2<br>.5 | .67<br>13/16<br>3<br>.75 |
| 7 | 0<br>11/16<br>0<br>0 | 0<br>5/16<br>0<br>0 | 0<br>13/16<br>0<br>0 | 0<br>7/16<br>0<br>0 | .67<br>15/16<br>3<br>.75 | .67<br>1/16<br>2<br>.5 | .67<br>9/16<br>3<br>.75 | .67<br>3/16<br>2<br>.5 | s = i

Fig. 4

|  | | t = j | | | | | | | |
|---|---|---|---|---|---|---|---|---|---|
|  | | 0 | 1 | 2 | 3 | 4 | 5 | 6 | 7 |
| Mo(s,t) → <br> Wm(i,j) → <br> Um(i,j) → <br> Mr(i,j) → | 0 | .33 <br> 9/16 <br> 1 <br> .25 | .33 <br> 3/16 <br> 1 <br> .25 | .33 <br> 11/16 <br> 2 <br> .5 | .33 <br> 5/16 <br> 1 <br> .25 | 0 <br> 13/16 <br> 0 <br> 0 | 0 <br> 7/16 <br> 0 <br> 0 | 0 <br> 15/16 <br> 0 <br> 0 | 0 <br> 1/16 <br> 0 <br> 0 |
|  | 1 | .33 <br> 7/16 <br> 1 <br> .25 | .33 <br> 15/16 <br> 2 <br> .5 | .33 <br> 1/16 <br> 1 <br> .25 | .33 <br> 9/16 <br> 1 <br> .25 | 0 <br> 3/16 <br> 0 <br> 0 | 0 <br> 11/16 <br> 0 <br> 0 | 0 <br> 5/16 <br> 0 <br> 0 | 0 <br> 13/16 <br> 0 <br> 0 |
|  | 2 | .33 <br> 11/16 <br> 2 <br> .5 | .33 <br> 5/16 <br> 1 <br> .25 | .33 <br> 13/16 <br> 2 <br> .5 | .33 <br> 7/16 <br> 1 <br> .25 | 0 <br> 15/16 <br> 0 <br> 0 | 0 <br> 1/16 <br> 0 <br> 0 | 0 <br> 9/16 <br> 0 <br> 0 | 0 <br> 3/16 <br> 0 <br> 0 |
| s = i | 3 | .33 <br> 1/16 <br> 1 <br> .25 | .33 <br> 9/16 <br> 1 <br> .25 | .33 <br> 3/16 <br> 1 <br> .25 | .33 <br> 11/16 <br> 2 <br> .5 | 0 <br> 5/16 <br> 0 <br> 0 | 0 <br> 13/16 <br> 0 <br> 0 | 0 <br> 7/16 <br> 0 <br> 0 | 0 <br> 15/16 <br> 0 <br> 0 |
|  | 4 | .67 <br> 13/16 <br> 3 <br> .75 | .67 <br> 7/16 <br> 3 <br> .75 | .67 <br> 15/16 <br> 3 <br> .75 | .67 <br> 1/16 <br> 2 <br> .5 | .67 <br> 9/16 <br> 3 <br> .75 | .67 <br> 3/16 <br> 2 <br> .5 | .67 <br> 11/16 <br> 3 <br> .75 | .67 <br> 5/16 <br> 2 <br> .5 |
|  | 5 | .67 <br> 3/16 <br> 2 <br> .5 | .67 <br> 11/16 <br> 3 <br> .75 | .67 <br> 5/16 <br> 2 <br> .5 | .67 <br> 13/16 <br> 3 <br> .75 | .67 <br> 7/16 <br> 3 <br> .75 | .67 <br> 15/16 <br> 3 <br> .75 | .67 <br> 1/16 <br> 2 <br> .5 | .67 <br> 9/16 <br> 3 <br> .75 |
|  | 6 | .67 <br> 15/16 <br> 3 <br> .75 | .67 <br> 1/16 <br> 2 <br> .5 | .67 <br> 9/16 <br> 3 <br> .75. | .67 <br> 3/16 <br> 2 <br> .5 | .67 <br> 11/16 <br> 3 <br> .75 | .67 <br> 5/16 <br> 2 <br> .5 | .67 <br> 13/16 <br> 3 <br> .75 | .67 <br> 7/16 <br> 3 <br> .75 |
|  | 7 | .67 <br> 5/16 <br> 2 <br> .5 | .67 <br> 13/16 <br> 3 <br> .75 | .67 <br> 7/16 <br> 3 <br> .75 | .67 <br> 15/16 <br> 3 <br> .75 | .67 <br> 1/16 <br> 2 <br> .5 | .67 <br> 9/16 <br> 3 <br> .75 | .67 <br> 3/16 <br> 2 <br> .5 | .67 <br> 11/16 <br> 3 <br> .75 |

Fig. 5

|  | t = j | | | | | | | |
|---|---|---|---|---|---|---|---|---|
|  | 0 | 1 | 2 | 3 | 4 | 5 | 6 | 7 |
| Yo(s,t) → Wy(i,j) → Uy(i,j) → Yr(i,j) → | .33<br>3/16<br>1<br>.25 | .33<br>11/16<br>2<br>.5 | .33<br>5/16<br>1<br>.25 | .33<br>13/16<br>2<br>.5 | .67<br>7/16<br>3<br>.75 | .67<br>15/16<br>3<br>.75 | .67<br>1/16<br>2<br>.5 | .67<br>9/16<br>3<br>.75 |
| 1 | .33<br>15/16<br>2<br>.5 | .33<br>1/16<br>1<br>.25 | .33<br>9/16<br>1<br>.25 | .33<br>3/16<br>1<br>.25 | .67<br>11/16<br>3<br>.75 | .67<br>5/16<br>2<br>.5 | .67<br>13/16<br>3<br>.75 | .67<br>7/16<br>3<br>.75 |
| 2 | .33<br>5/16<br>1<br>.25 | .33<br>13/16<br>2<br>.5 | .33<br>7/16<br>1<br>.25 | .33<br>15/16<br>2<br>.5 | .67<br>1/16<br>2<br>.5 | .67<br>9/16<br>3<br>.75 | .67<br>3/16<br>2<br>.5 | .67<br>11/16<br>3<br>.75 |
| 3 | .33<br>9/16<br>1<br>.25 | .33<br>3/16<br>1<br>.25 | .33<br>11/16<br>2<br>.5 | .33<br>5/16<br>1<br>.25 | .67<br>13/16<br>3<br>.75 | .67<br>7/16<br>3<br>.75 | .67<br>15/16<br>3<br>.75 | .67<br>1/16<br>2<br>.5 |
| 4 | .67<br>7/16<br>3<br>.75 | .67<br>15/16<br>3<br>.75 | .67<br>1/16<br>2<br>.5 | .67<br>9/16<br>3<br>.75 | 0<br>3/16<br>0<br>0 | 0<br>11/16<br>0<br>0 | 0<br>5/16<br>0<br>0 | 0<br>13/16<br>0<br>0 |
| 5 | .67<br>11/16<br>3<br>.75 | .67<br>5/16<br>2<br>.5 | .67<br>13/16<br>3<br>.75 | .67<br>7/16<br>3<br>.75 | 0<br>15/16<br>0<br>0 | 0<br>1/16<br>0<br>0 | 0<br>9/16<br>0<br>0 | 0<br>3/16<br>0<br>0 |
| 6 | .67<br>1/16<br>2<br>.5 | .67<br>9/16<br>3<br>.75 | .67<br>3/16<br>2<br>.5 | .67<br>11/16<br>3<br>.75 | 0<br>5/16<br>0<br>0 | 0<br>13/16<br>0<br>0 | 0<br>7/16<br>0<br>0 | 0<br>15/16<br>0<br>0 |
| 7 | .67<br>13/16<br>3<br>.75 | .67<br>7/16<br>3<br>.75 | .67<br>15/16<br>3<br>.75 | .67<br>1/16<br>2<br>.5 | 0<br>9/16<br>0<br>0 | 0<br>3/16<br>0<br>0 | 0<br>11/16<br>0<br>0 | 0<br>5/16<br>0<br>0 | s = i

Fig. 6

METHOD FOR PRODUCING A MULTITONE IMAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a method for producing multitone image data from data representative of an original image and, in particular, for producing multitone image data with a set of N output darkness levels U greater than 2 from original darkness values $V_o$ representative of an original image.

2. Description of Related Art

Any photograph, painting, etc., consisting of a broad range of tones or gradation of tones is known as a continuous tone image or picture. In paintings, changing the pigment concentration or the amount of deposit of the printing media on a substrate modulates the color values throughout an entire picture. In photography, the different tones are created by varying amounts of silver, which appears black, in image areas.

In most forms of printing, tones cannot be reproduced by varying concentrations or amounts of ink. Many printing processes can print only a solid density of a color in an image area, while no ink prints in a non image area. In order to reproduce the varying tones of a continuous tone original image, a halftone process can be used to convert the original image into a pattern of very small and clearly defined dots. More specifically, the original image can be scanned with a light beam using an image scanner to obtain an electronic signal containing image information in the form of intensity levels or optical density variations corresponding to elemental picture areas, known as pixels, of the original picture. Then a thresholding technique can be used to generate data or an output that can cause ink to be printed in a pixel of the halftone reproduction if the intensity level or optical density variation of the corresponding pixel in the original image exceeds a predetermined value. The output can be stored in a memory or used directly to drive a recorder, such as an exposing device, a printer or a computer display.

In halftoning processes, each dot in the reproduced image has the same tonal value or optical density. Various tones in the original are represented in the halftone image by a large number of evenly spaced dots which can have different sizes. Larger dots produce darker tones. Smaller dots or fewer dots make lighter tones. Halftones have the appearance of continuous tone images because of the limited resolving power of the human eye. When viewed at a normal reading distance, the individual dots blend into and appear like a "continuous" tone.

In the reproduction of color images, the original multicolored image is typically scanned through separate sets of colored filters to produce four separate image signals, corresponding to three primary colors and, possibly, black. The chosen primary colors for color printing are typically cyan, magenta and yellow. The chosen primary colors for a color computer display are typically red, green and blue. The separate signals are processed as described above. In other words, a color separation signal representative of a pattern of very small and clearly defined dots is generated for each of the colors where the dots in each of the patterns has the same tonal value or optical density throughout that pattern. Then the patterns for each color must be combined.

For instance, an exposing device may produce black and white film transparencies, corresponding to each of the cyan, magenta, yellow and black color separation signals, known as color separation transparencies or color separations for short. The color separations are used to make printing plates. The printing plates are mounted on a printing press to print, in registration, four overlapping single colored images to reconstruct the multicolored original.

The electronic output signals may also be used to directly drive a color printer or a computer display to produce a reconstructed multicolored image without ever producing actual color separations or printing plates.

It is desirable to provide a method for producing a multitone image using a set of at least 3 output darkness values (or levels) for at least one output color from data representative of an original image.

SUMMARY OF THE INVENTION

The present invention is related to a method for producing a multitone image corresponding to an array of output pixels (i,j) using a number N of at least 3 output darkness levels U(i,j) for at least one output color from original darkness values $V_o(s,t)$ of an array of input pixels (s,t) representative of an original image, comprising:

determining one of the output darkness levels U(i,j) corresponding to selected ones of the original darkness values $V_o(s,t)$ using the equation:

$$\lfloor U(i,j) = (N-1)V_o(s,t) + W(i,j) \rfloor ,$$

where $0 \leq W(i,j) \leq 1$; and using the output darkness levels U(i,j) to produce the multitone image representative of the original image.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Throughout the following detailed description, similar reference characters refer to similar elements in all figures of the drawings.

Figure 1:
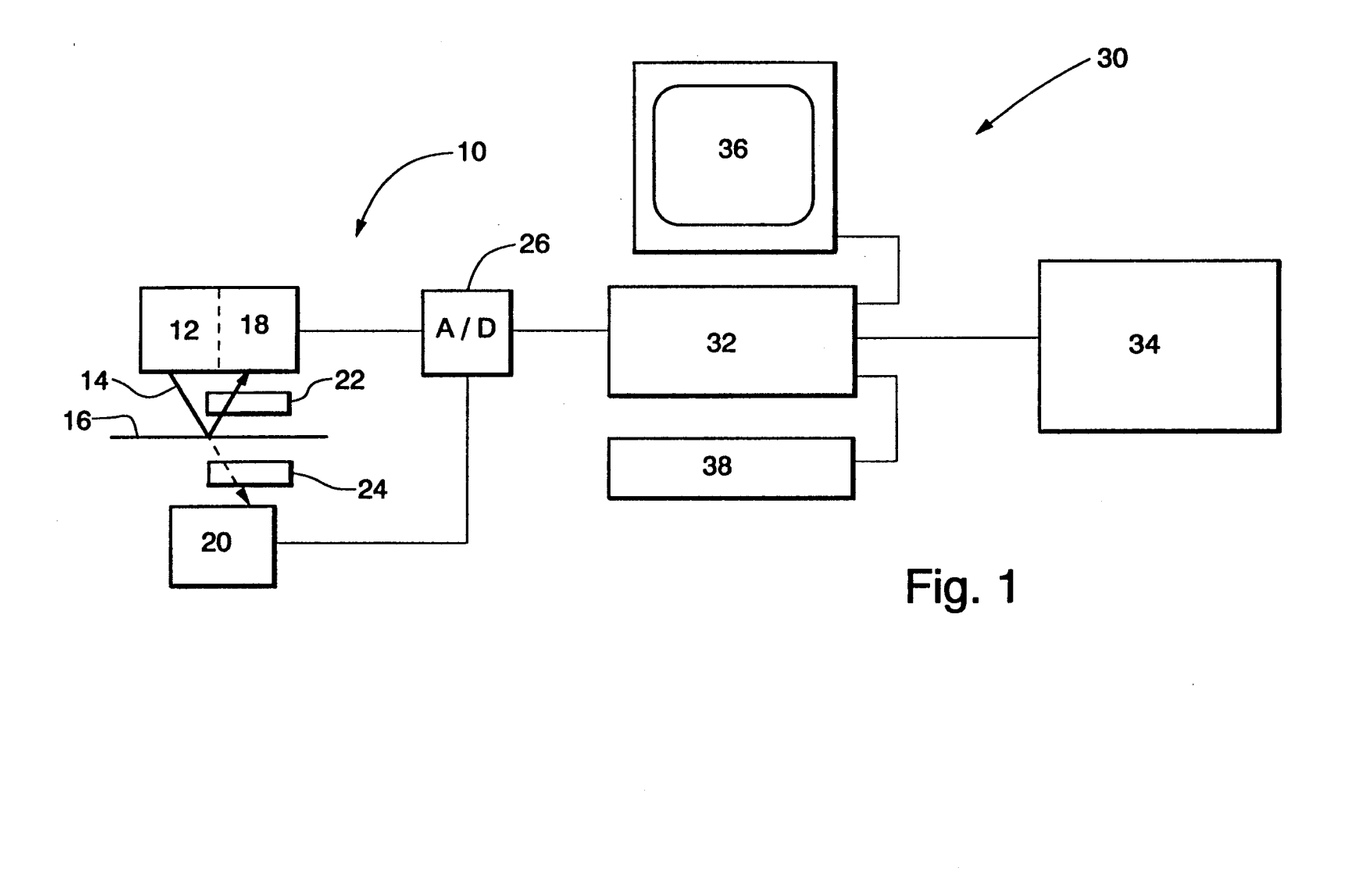
FIG. 1 illustrates a schematic system for reproducing images.

Referring to FIG. 1, there is shown a system of various electronic or other machine elements typically used by the graphic arts industry to facilitate image reproduction including black and white and colored image reproduction. It should be understood that the depicted system is schematic and should not be considered as limiting to the present invention, but the depicted system is simply used as an aid to this description so as to better understand the scope of this invention.

In view of the above, FIG. 1 illustrates an image scanner 10 comprising means 12 for generating and directing a beam 14 of light for illuminating an original image 16 that we intend to eventually reproduce. The image 16 can be, for instance, a continuous tone black and white (or color) photograph. Alternatively, the image 16 can be, for instance, a continuous tone black and white (or color) transparency. The generating and directing means 12 can, for instance, cause the beam 14 to scan the image 16 in a sequential raster fashion. The scanner 10 includes a light detector 18 which can be used to collect the light reflected from a photograph 16. Alternatively or in addition, the scanner 10 may include a light detector 20 which can be used to collect the light transmitted through a transparency 16. The image scanner 10 then generates an electrical video signal output which contains image information for each picture element or pixel of the original image 16. A filter wheel 22 can contain a plurality of filters, such as 3 filters and a clear space, positioned between the image 16 and the detector 18 to filter the beam 14 reflecting from the photograph 16, so that specific image information for each of three preselected colors, i.e., magenta, cyan and yellow, as well as black is obtained for each scanned picture element or pixel. A similar filter wheel 24 can be used to filter the beam 14 passing through the transparency 16.

The information for the four colors, black being also considered a color comprising a gray scale of tones such as are found in a black and white picture, may be obtained simultaneously and outputted in four parallel channels, by splitting the beam 14 through the filters in the filter wheel 22 or 24 and using four detectors 18 or 20, or it may be sequential, each color obtained after a complete scan of image, or any other variation. Preferably, an analog to digital (A/D) converter 26 will be included in the scanner 10 to provide a digital output image density signal value for each of the four colors for each pixel. For each pixel, the output values from the A/D converter 26 can be referred to as original color separation image optical density values or data $D_o$. The original color separation image optical density values $D_o$ are sent to a processor unit 30 which may include a computer 32 with appropriate software adapted to process the image data prior to sending the data to a means for displaying a reproduced or copy image. The displaying means may include a recorder or printer 34 or a computer monitor 36, such as a color monitor. The processor unit 30 may include means 38 for providing operator input, such as a keyboard, a mouse and/or other devices. Optical density values D do not change linearly from light to dark, so the original color separation image optical density values or data (D) can be converted to linear darkness values (V) by any means, such as using the Bartleson-Breneman equation, or a variant thereof, as follows:

$$V = 1 - 10^{-D} \tag{1}$$

Regardless of the apparatus and method employed, original color separation image linear darkness values $V_o(s,t)$ are obtained or generated for each picture element or pixel (s,t) of an original image for each color to be used in the reproduction.

For reproduction of a monochrome black and white original image, a single set of original color separation image linear darkness values $V_o(s,t)$ is obtained where the color is defined to be black. The original color separation image linear darkness values $V_o(s,t)$ corresponding to the color black can be referred to as values $K_{o(s,t)}$. Typically, for reproduction of a multicolor image on a computer color display monitor, a set of original color separation image linear darkness values $V_o(s,t)$ is obtained for each color to be used in displaying the image. Such colors consist of red, green and blue resulting in original color separation image linear value $R_o(s,t)$, $G_o(s,t)$ and $B_o(s,t)$, respectively. Using a scanner that generates 8 bits of binary information for each input pixel (s,t), each original darkness value $K_o$, $R_o$, $B_o$ and $G_o$ can have any integer value between and including 0 and 255. When printing a reproduction on a printer, the set of colors preferably consist of cyan, magenta, yellow and black, where black is defined as a color. The original color separation image linear darkness values $V_o(s,t)$ corresponding to the colors cyan, magenta and yellow can be referred to as values $C_o(s,t)$, $M_o(s,t)$ and $Y_o(s,t)$, respectively. The $C_o$, $M_o$ and $Y_o$ values are real numbers within the range of $0 \leq V_o \leq 1$.

For the purpose of explaining the present invention, when original red, green and blue separation image linear darkness values $V_o(s,t)$ are provided, we will convert them to corresponding original cyan, magenta and yellow separation image linear darkness values $V_o(s,t)$ using the following equations:

$$C_o = 1 - R_o/255 \tag{2}$$

$$M_o = 1 - G_o/255 \tag{3}$$

$$Y_o = 1 - B_o/255 \tag{4}$$

The present invention comprises a method for producing a multitone image corresponding to an array of output pixels (i,j) from original darkness values $V_o(s,t)$ for at least one color of an array of input pixels (s,t) representative of an original image. Preferably the original image can have any form. The original image can even be a virtual image, such as computer generated virtual image, as opposed to a real or actual image.

The present method is adapted to use a set of output (or destination) darkness levels U for each color to be used in the reproduction. The set comprises a number N which is greater than 2 for at least one of the colors used in the reproduction. The number for each set can be the same or different. In a typical halftoning process, the total number N of output darkness levels U used to reproduce each color is two, a first level where the single tone dot is "on" and a second level where the single tone dot is "off". In the multitoning process of the present invention, there are at least 3 output (or destination) darkness levels U available for each output pixel (i,j). For instance, a first one of the output darkness levels U can be where a first black (or other color) tone dot is "on", a second output darkness level U can be where the first black (or other color) tone dot is "off" and a third level U can be a second tone or shade of the color intermediate between the first level and the second level.

Typical graphics adaptors or controllers for color monitors using 8 bits per pixel provide a total of 256 palette indices P. As a result, the product of the number of output darkness levels U for each of the colors used can not exceed 256. While it is reasonable to make the number of output darkness levels U the same for each color, this may not be the best possible distribution because the visual system is not equally sensitive to the individual colors. In terms of computational efficiency, it is preferred to assign 5 equally spaced output darkness levels U, i.e., $\{0, 1, 2, 3, 4\}$, to each color. This makes the output darkness interval between adjacent levels to be $\frac{1}{4}$ of the total of the intervals. It further makes the set of output or reproduction darkness values $V_r$ to be $\{0, \frac{1}{4}, \frac{1}{2}, \frac{3}{4}, 1\}$ where the values $\frac{1}{4}, \frac{1}{2}$, and $\frac{3}{4}$ are intermediate gray levels or tonal shades between the value 0 (representing dot "off") and the value 1 (representing the use of the darkest dot of the set of output tones). It further uses less than half (i.e., 5*5*5=125) of the possible 256 palette indices P. The relation between U and $V_r$ is $U=(N-1)V_r$.

Thus, if not already accomplished, the method of the present invention includes establishing a set of N output darkness levels U to be used for each color in the reproduction.

After the set(s) of output darkness levels U are established for each color, the process of the present invention includes determining or selecting one of the preestablished set(s) of output darkness levels U corresponding to selected ones of the original darkness values $V_o$ of the input pixels (s,t).

If the number of input pixels (s,t) is the same as the number of output pixels (i,j), then one of the preestablished set of output darkness levels (U) can be determined or selected for each of the original darkness values $V_o$ of the input pixels (s,t). If the number of input pixels (s,t) is more than the number of output pixels (i,j), then certain ones of the original darkness values $V_o$ of the input pixels (s,t) can be skipped in selecting or determining one of the preestablished set of output darkness levels U for corresponding original darkness values $V_o$ of the input pixels (s,t). If the number of input pixels (s,t) is less than the number of output pixels (i,j), then output darkness levels U are determined or selected for each of the original darkness values $V_o$ of the input pixels (s,t) and such output darkness levels U can be repeated for extra output pixels (i,j). This is typically referred to as "scaling" and methods for scaling are well known to those skilled in the art.

In order to determine or select the output darkness levels U(i,j) corresponding to the original darkness values $V_o$(s,t) of the input pixels (s,t), the following equation is used:

$$\lfloor U(i,j) = (N-1)V_o(s,t) + W(i,j) \rfloor, \quad (5)$$

where $0 \leq W(i,j) \leq 1$. Further, the half brackets "$\lfloor \rfloor$" indicate the floor function which is the highest integer less than or equal to the real number contained in the brackets. For instance, the floor function of 1.3, (i.e., $\lfloor 1.3 \rfloor$) is 1. Further, $\lfloor -1.3 \rfloor$ is $-2$.

Preferably, the number of the original darkness values $V_o$(s,t) exceeds N. Preferably, N−1 is a power of 2. For instance, N=2, 3, 5, 9, etc. Further, preferably the multiplication by N−1 in equation (5) is done by a binary shift.

Figure 2:
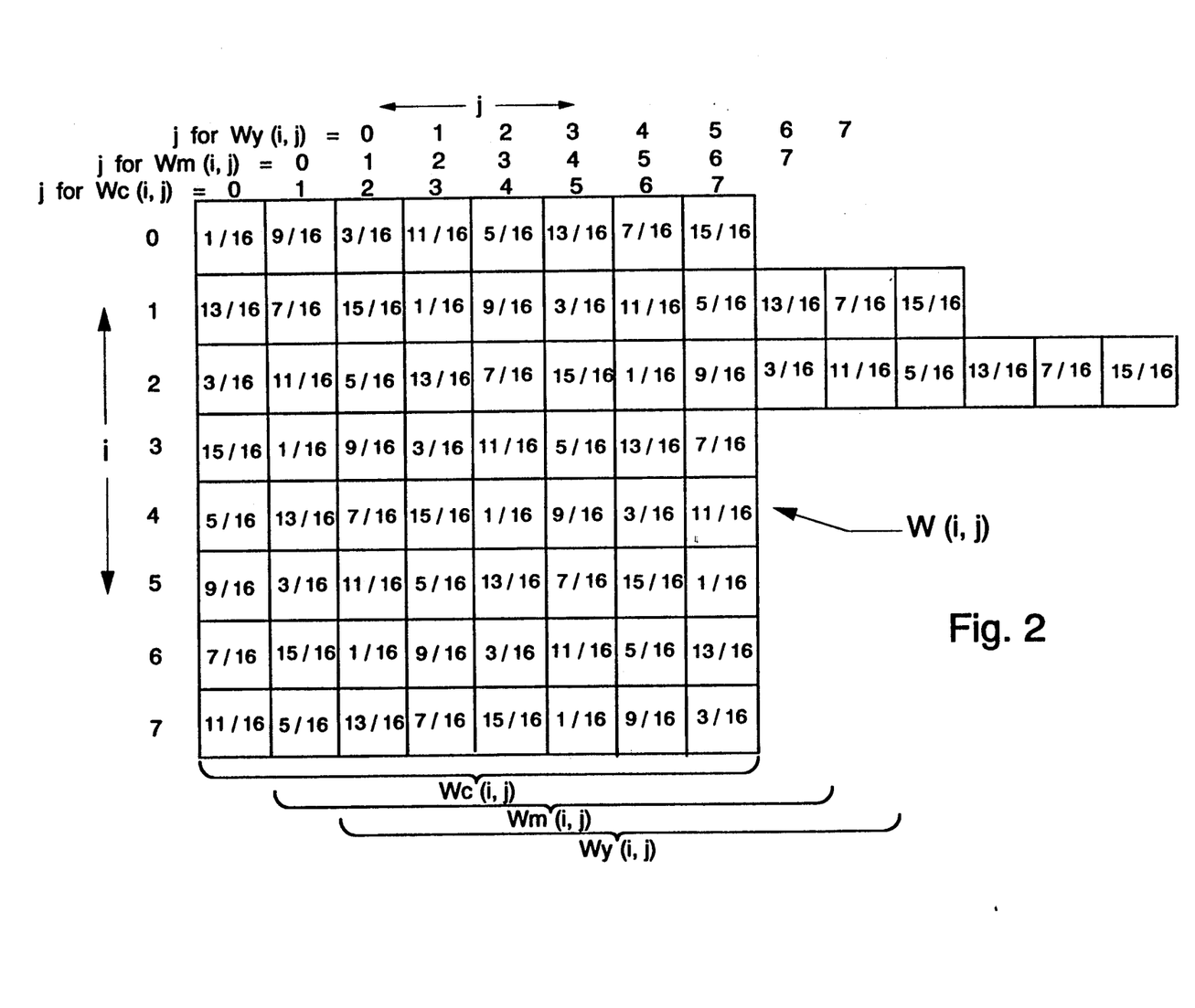
FIG. 2 illustrates a repeating pattern of screen values W(i,j) for use in a method for producing a multitone image in accordance with the present invention.

In a first preferred embodiment, W(i,j) is selected from a repeating pattern of screen values. The number w of screen values in the repeating pattern can be any positive integer. The greater the integer, the more gradations of average output darkness values $V_r$ are available for reproducing a solid area of constant $V_o$ in the original image. However, the greater the integer, the more computations will be necessary to precompute output darkness levels U(i,j) for a look-up table. Further, the greater the integer, the more noticeable the repeating patterns are to the human eye. Preferably, the number w of screen values in the repeating pattern is a power of two, i.e., 1, 2, 4, 8, 16. etc. Preferably, numeric values for W(i,j) are equally spaced within the interval of 0 through 1. As an illustration of numeric values for W(i,j) that are equally spaced within the interval of 0 through 1, a unit cell of the repeating pattern of W(i,j) may comprise the screen values of 1/16, 9/16, 3/16, 11/16, 5/16, 13/16, 7/16, and 15/16, in the order listed. FIG. 2 illustrates this repeating pattern of screen values W(i,j) and correlates them to output pixels (i,j) with both i and j ranging from 0 through 7. The order of the chosen screen values is selected to result in the finest (i.e., the highest spatial frequency) possible to reduce or minimize visible patterns.

Preferably, the repeating pattern in each line i is offset with respect to the repeating pattern in adjacent lines i−1 and i+1. The repeating pattern in the adjacent lines i−1 and i+1 can be either offset to the right or left from the pattern in line i. The repeating pattern in the adjacent lines i−1 and i+1 can be offset (to the right or left from the pattern in line i) by any number of output pixels (i,j) less than or equal to the number w of screen values in the repeating pattern. Preferably, when the number w is 8, the repeating pattern in the adjacent lines i−1 and i+1 is offset (to the right or left from the pattern in line i) by either 3 or 5 output pixels. FIG. 2 illustrates that the repeating pattern in each line i+1 is offset to the right by 3 output pixels with respect to its preceding line i. For emphasis in FIG. 2, the unit cell of repeating screen values W(i,j) has been outlined by a bold line in lines i=0, 1 and 2 resulting in the unit cells extending to the right of j=7 in lines i=1 and 2.

Also, preferably for multicolor output images, the repeating pattern of each color in the same scan line is offset from other colors. For instance, as shown in FIG. 2, the pattern of screen values $W_m$(i,j) for a magenta output plane or separation can be offset one (or more) output pixels to the right or left from the same pattern of screen values $W_c$(i,j) for a cyan output plane or separation. Similarly, as shown in FIG. 2, the pattern of screen values $W_y(i,j)$ for a yellow output plane or separation can be offset one (or more) output pixels to the right or left from the same pattern of screen values $W_m(i,j)$ for the magenta output plane or separation.

In a second embodiment, $W(i,j)$ is a screen value selected in a random fashion. In both the first embodiment and the second embodiment, the average screen value of $W(i,j)$ is preferably ½ or about ½. In a third embodiment, $W(i,j)$ is always ½.

If $W(i,j)$ is always ½ in equation (5) as in the third embodiment, then the output darkness level $U(i,j)$ determined from equation (5) is always the closest one of the preestablished output darkness levels $U(i,j)$ there is to the corresponding original darkness value $V_o(s,t)$. However, this presents a problem for large solid areas of constant original darkness value $V_o$. For instance, assume there are preestablished output darkness levels $U(i,j)$ which are {0, 1, 2, 3, 4}. From the relation $U=(N-1)V_r$, this means the output or reproduction darkness values $V_r(i,j)$ are {0, ¼, ½, ¾, 1}. Further, assume $V_o$ is ⅜ over a large area in the original image. Then, using equation (5) and the relation $U=(N-1)V_r$, the output darkness value $V_r(i,j)$ is ¼ for the whole area in the output image corresponding to the large area of constant $V_o$ in the original image. This is a significant difference. To do better, some of the output darkness values $V_r(i,j)$ should be ¼ and some of the output darkness values $V_r(i,j)$ should be ½ such that the average output darkness value $V_r(i,j)$ is ⅜ for the area in the output image corresponding to the large area of constant $V_o$ in the original image. The first embodiment allows solid areas of constant $V_o$ in an original image to be reproduced in an output image as one of a plurality of patterns of output pixels.

Figure 3:
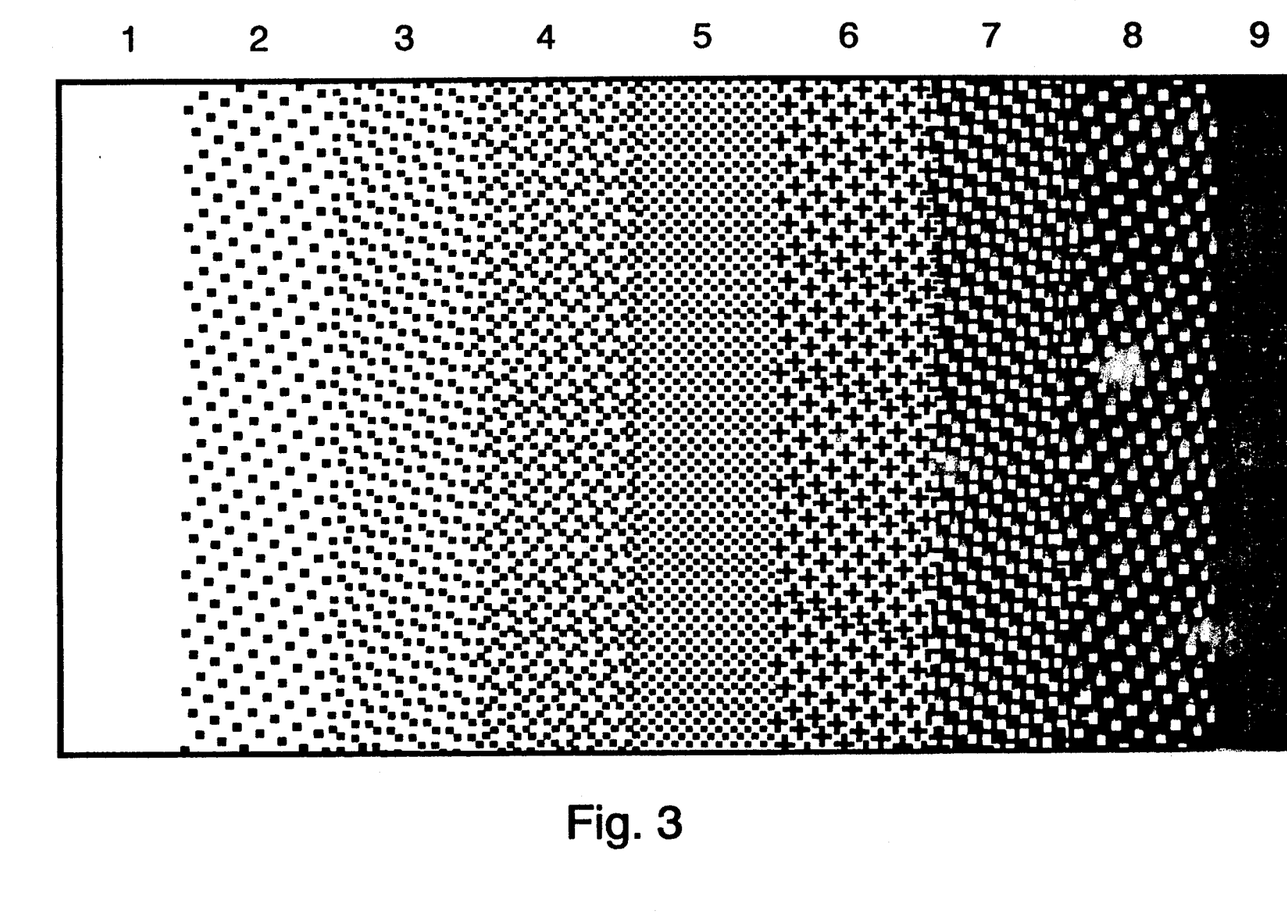
FIG. 3 illustrates an output image where the number N of output darkness levels U(i,j) is 2 (i.e., on and off) using screen values W(i,j) of FIG. 2 when $V_o(s,t)$ varys linearly from 0 to 1 resulting in a plurality of output patterns in the output image.

FIG. 3 illustrates an output image with a plurality of output patterns, specifically 9 output patterns, which are labeled 1-9 across the top of the output image. The output image of FIG. 3 would be generated from an input image where $V_o(s,t)$ varys linearly from 0 to 1 horizontally, using equation (5), the screen values $W_c(i,j)$ of FIG. 2 with a repeating pattern of 8 values w, and with the number N of output darkness levels $U(i,j)$ and values $V_r(i,j)$ being 2 (i.e., on or off). The far left pattern (the pattern labeled number 1) is with all the output darkness values $V_r(i,j)$ being off. The far right pattern (the pattern labeled number 9) is with all the output darkness values $V_r(i,j)$ being on. The intermediate patterns 2-8 have more output darkness values $V_r(i,j)$ on as the patterns go from left to right across the image. The appearance to the human eye is that the 9 patterns get darker from left to right. FIG. 3 demonstrates that under these conditions there are 9 possible average output darkness values $V_r(i,j)$ for representing a solid area of constant $V_o(s,t)$ from an original image. More generally, with N output darkness levels $U(i,j)$ and w values in the repeating screen pattern, then the second embodiment provides $(N-1)w+1$ possible average output darkness values $V_r$ for reproducing a solid area of constant $V_o$ in an original image. In the preferred case, $N=5$ and $w=8$ resulting in 33 possible average output darkness values $V_r$ for reproducing a solid area of constant $V_o$ in an original image.

In each embodiment, the determination or computation is performed independently for each output pixel $(i,j)$. The computation can be performed in sequential raster fashion. For instance, $U(i,j)$ is first calculated for output pixel (1,1). Then $U(i,j)$ is calculated for adjacent or neighbor pixels in the scan line 1, one at a time, each time increasing j by 1 until $U(i,j)$ is determined for each pixel (1,j). Then the same is accomplished for successive scan lines, increasing i by 1 each time until $U(i,j)$ is determined for all pixels $(i,j)$.

Alternatively, the output darkness levels $U(i,j)$ are determined by reference to a look-up table of values precalculated using equation (5) where $V_o(s,t)$ ranges over all possible original values and $(i,j)$ range over one repetition of the pattern of the screen values $W(i,j)$.

Then the output darkness levels $U(i,j)$ are used to produce the multitone image representative of the original image. If more than one output color is used, the output darkness levels $U(i,j)$ are selected or determined for each color independently as described above. Then the output darkness levels $U(i,j)$ for each color are used to produce the multitone and multicolor image representative of the original image. The image produced can be a visible image reproduced on a substrate, such as paper, or a computer display screen. Alternatively, the image can be a virtual image stored in memory in the computer 32 or elsewhere.

To illustrate the above described method of the present invention, an example is provided determining the output darkness levels $U(i,j)$ and, thus, the output darkness values $V_r(i,j)$ associated with three colors (i.e., cyan, magenta and yellow) for an 8 by 8 array of output pixels $(i,j)$ corresponding one to one to original darkness values $V_o(i,j)$ of an 8 by 8 array of input pixels $(s,t)$. The number N of tones or output darkness levels $U(i,j)$ chosen or established is 5 (i.e., levels 0, 1, 2, 3 and 4) for each color which are equally spaced providing a corresponding set of output darkness values $V_r(i,j)$ comprising 0, ¼, ½, ¾ and 1 for each color. The screen values $W(i,j)$ used in this example are those provided in FIG. 2.

Figure 4:
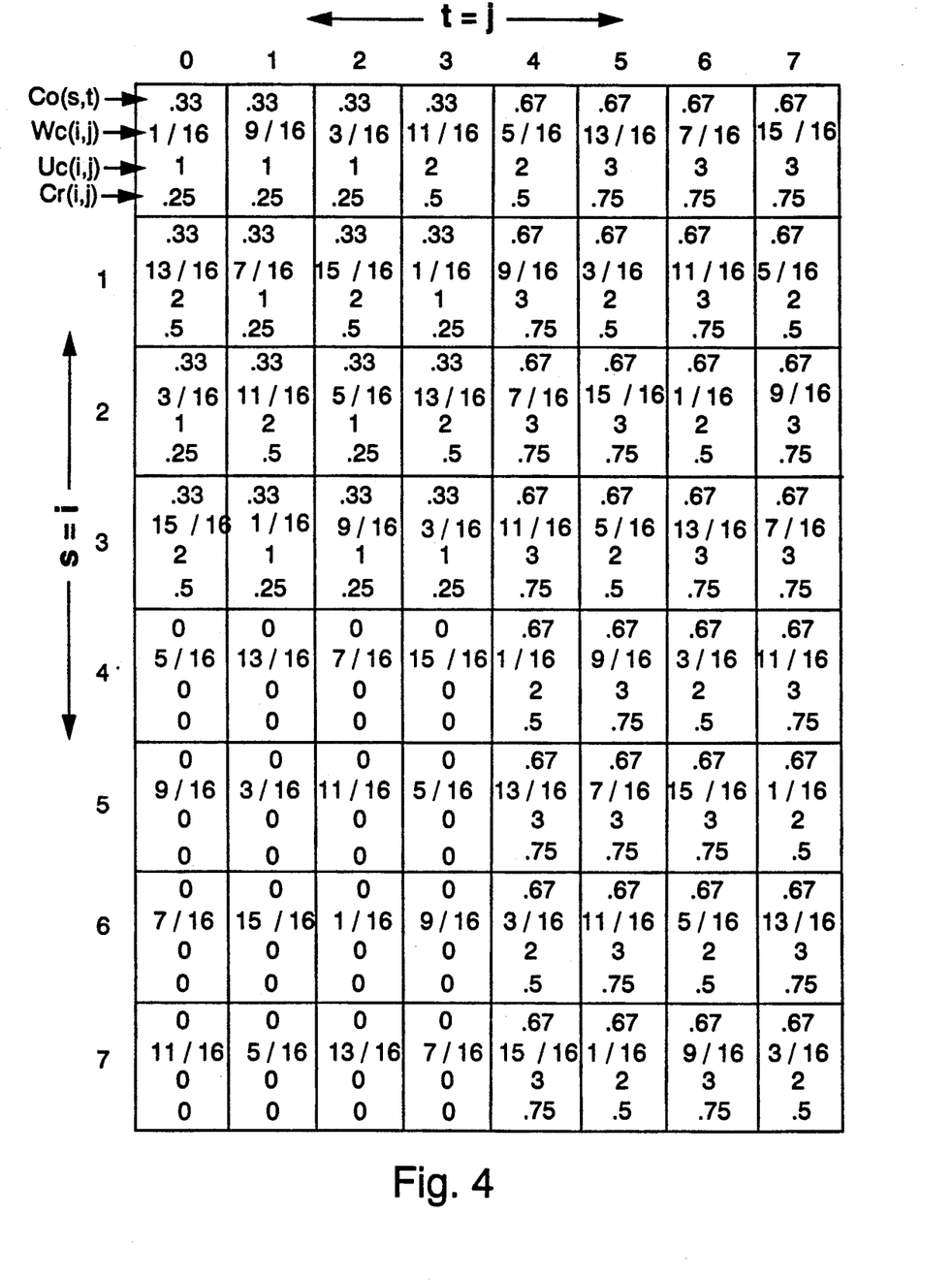
FIG. 4 illustrates original darkness values $V_o(s,t)$ of an original image for the color cyan, corresponding screen values $W_c(i,j)$ and resulting output darkness levels $U_c(i,j)$ for the color cyan and corresponding reproduction darkness values $C_r(i,j)$ using the method of the present invention.

FIG. 4 depicts a chart representing the 8 by 8 array of input pixels $(s,t)$ with s being the row or scan line increasing from 0 to 7 from the top to the bottom of the chart and t being the column increasing from 0 to 7 from the left to the right of the chart. Since there is a one to one correspondence between the input pixels and the output pixels, $s=i$ and $t=j$. In each pixel represented in the chart, there is listed (1) an original darkness value $C_o(s,t)$ of an original image for the color cyan for the input pixel $(s,t)$, (2) a corresponding screen value $W_c(i,j)$ for the corresponding output pixel $(i,j)$, (3) a resulting output darkness level $U_c(i,j)$ for the corresponding output pixel $(i,j)$ for the color cyan, (4) and a corresponding reproduction or output darkness value $C_r(i,j)$ for the corresponding output pixel $(i,j)$ using the method of the present invention. As can be seen from FIG. 4, the original darkness value $C_o(s,t)$ of each one of the 16 input pixels $(s,t)$ in the upper left quadrant is 0.33; the original darkness value $C_o(s,t)$ of each one of the 16 input pixels $(s,t)$ in the upper right quadrant is 0.67; the original darkness value $C_o(s,t)$ of each one of the 16 input pixels $(s,t)$ in the lower left quadrant is 0; and the original darkness value $C_o(s,t)$ of each one of the 16 input pixels $(s,t)$ in the lower right quadrant is 0.67. First, regarding output pixel (0,0), the output darkness level $U_c(0,0)$ corresponding to the original darkness value $C_o(0,0)$ of the input pixel (0,0) is determined using equation (5) as follows:

$$U_c(i,j) = \lfloor (N-1)C_o(s,t) + W_c(i,j) \rfloor,$$
$$= \lfloor (5-1)(.33) + 1/16 \rfloor$$

-continued $$= \lfloor 1.32 + .0625 \rfloor$$

$$= \lfloor 1.3825 \rfloor$$

= 1 (which has a corresponding output darkness value $C_r(0,0)$ of 1/4 or .25)

This calculation is repeated for each pixel (i,j) across the scan line s increasing t by one each time. Then the calculation is performed for the left most pixel in the next lower scan line s. This is repeated until the calculation is performed for all output pixels (i,j). FIG. 4 lists all the output darkness levels $U_c(i,j)$ and the output darkness values $C_r(i,j)$ calculated in this manner. As can be seen from these output darkness values $C_r(i,j)$, the [original darkness value $C_o(s,t)$] average output darkness value $C_r(i,j)$ of the 16 output pixels (i,j) in the upper left quadrant is 0.34375; the average output darkness value $C_r(i,j)$ of the 16 output pixels (i,j) in the upper right quadrant is 0.671875; the average output darkness value $C_r(i,j)$ of the 16 output pixels (i,j) in the lower left quadrant is 0; and the average output darkness value $C_r(i,j)$ of the 16 output pixels (i,j) in the lower right quadrant is 0.640625.

Figure 5:
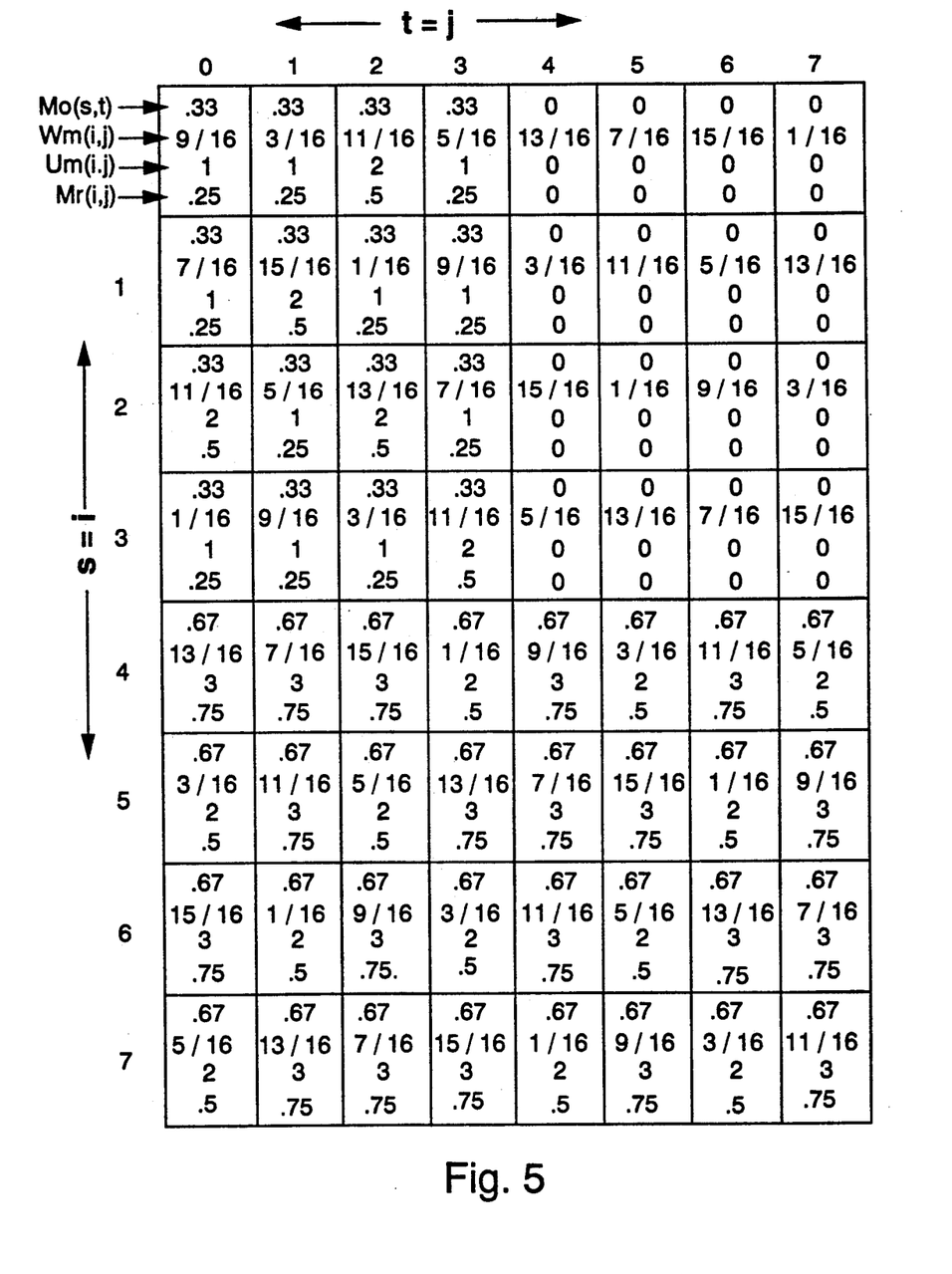
FIG. 5 illustrates original darkness values $V_o(s,t)$ of an original image for the color magenta, corresponding screen values $W_m(i,j)$ and resulting output darkness levels $U_m(i,j)$ for the color magenta and corresponding reproduction darkness values $M_r(i,j)$ using the method of the present invention.

Similarly, FIG. 5 illustrates (1) original darkness values $M_o(s,t)$ of the original image for the color magenta, (2) corresponding screen values $W_m(i,j)$, (3) resulting output darkness levels $U_m(i,j)$ for the color magenta, and (4) corresponding reproduction darkness values $M_r(i,j)$ using the method of the present invention. In this case, as can be seen from FIG. 5, the original darkness value $M_o(s,t)$ of each one of the 16 input pixels (s,t) in the upper left quadrant is 0.33; the original darkness value $M_o(s,t)$ of each one of the 16 input pixels (s,t) in the upper right quadrant is 0; the original darkness value $M_o(s,t)$ of each one of the 16 input pixels (s,t) in the lower left quadrant is 0.67; and the original darkness value $M_o(s,t)$ of each one of the 16 input pixels (s,t) in the lower right quadrant is 0.67. Here, as shown in FIG. 2, the screen value $W_m(i,j)$ is offset with respect to the screen value $W_c(i,j)$. Thus, for illustration purposes, the output darkness level $U_m(0,0)$ corresponding to the original darkness value $M_o(0,0)$ of the input pixel (0,0) is determined using equation (5) as follows:

$$U_m(i,j) = \lfloor (N-1)M_o(s,t) + W_m(i,j) \rfloor,$$

$$= \lfloor (5-1)(.33) + 9/16 \rfloor$$

$$= \lfloor 1.32 + .5625 \rfloor$$

$$= \lfloor 1.8825 \rfloor$$

= 1 (which has a corresponding output darkness value $M_r(0,0)$ of 1/4 or .25)

Figure 6:
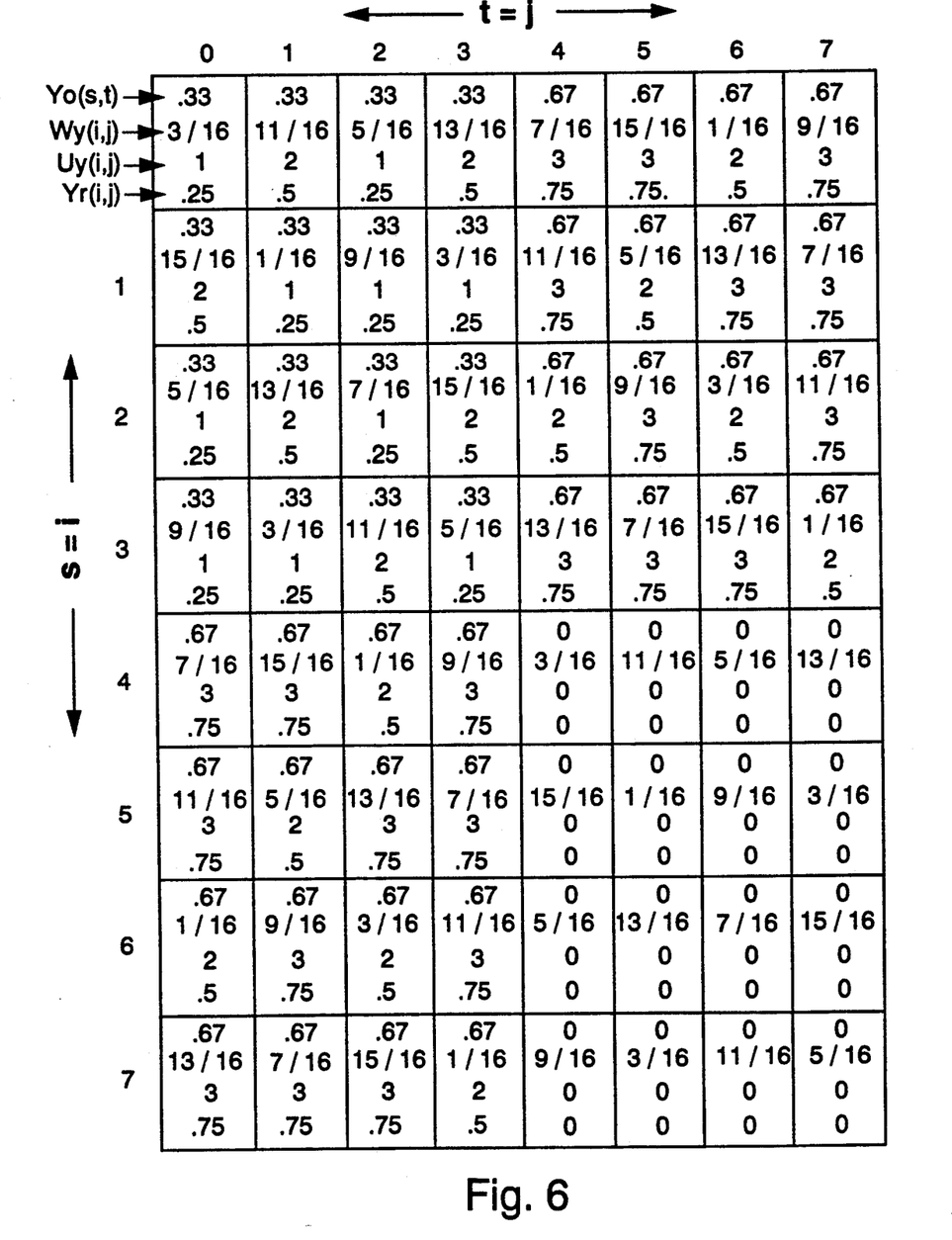
FIG. 6 illustrates original darkness values $V_o(s,t)$ of an original image for the color yellow, corresponding screen values $W_y(i,j)$ and resulting output darkness levels $U_y(i,j)$ for the color yellow and corresponding reproduction darkness values $V_r(i,j)$ using the method of the present invention.

Similarly, FIG. 6 illustrates (1) original darkness values $Y_o(s,t)$ of the original image for the color yellow, (2) corresponding screen values $W_y(i,j)$, (3) resulting output darkness levels $U_y(i,j)$ for the color yellow, and (4) corresponding reproduction darkness values $Y_r(i,j)$ using the method of the present invention. In this case, as can be seen from FIG. 6, the original darkness value $Y_o(s,t)$ of each one of the 16 input pixels (s,t) in the upper left quadrant is 0.33; the original darkness value $Y_o(s,t)$ of each one of the 16 input pixels (s,t) in the upper right quadrant is 0.67; the original darkness value $Y_o(s,t)$ of each one of the 16 input pixels (s,t) in the lower left quadrant is 0.67; and the original darkness value $Y_o(s,t)$ of each one of the 16 input pixels (s,t) in the lower right quadrant is 0.

This example shows that the average output darkness values $V_r(i,j)$ [i.e., $C_r(i,j)$, $M_r(i,j)$, and $Y_r(i,j)$, respectively] in each of the four quadrants approximates the original darkness values $V_o(s,t)$ [i.e., $C_o(s,t)$, $M_o(s,t)$, and $Y_o(s,t)$, respectively] in those quadrants for each of the colors. This is a good reproduction of the pixels (s,t) in the original image because the average intensity over the output pixels (i,j) approximates the average intensity of the input pixels (s,t) where intensity is defined as 1 minus the darkness value.

If the output image is to be displayed on a color monitor, one can convert the output darkness levels U(i,j) for each color for each pixel to a single palette index P(i,j) using the equation:

$$p(i,j) = (U_c * N_m + U_m) * N_y + U_y. \quad (6)$$

where (1) $N_c$, $N_m$ and $N_y$ are the number N of output darkness levels U for the colors cyan, magenta and yellow, respectively, and (2) $U_c$, $U_m$ and $U_y$ are the output darkness levels U for the colors cyan, magenta and yellow, respectively.

As an example, assume for one output pixel (i,j), $U_c=1$, $U_m=2$ and $U_y=4$. (These would have been determined using equation (5).) Further, assume $N_c=N_m=N_y=5$. Plugging the numbers into equation 6, we get:

$$\begin{aligned} P(i,j) &= (U_c * N_m + U_m) * N_y + U_y. \\ &= (1 * 5 + 2) * 5 + 4 \\ &= 39 \end{aligned}$$

Then the palette index P(i,j) can be used to select an entry from a look-up table of red, green and blue voltage values needed to display the corresponding darkness values $V_r$ for the combination of the 3 output colors (i.e., red, green and blue). P(i,j) need not be computed directly. Instead, look-up tables can be precomputed for each of cyan, magenta and yellow with an entry for each combination of screen value W(i,j) and original darkness value $V_o(s,t)$. Then entries in the cyan table would be $U_c * N_m * N_y$, those in the magenta table would be $U_m * N_y$, and those in the yellow table would be $U_y$. Then P(i,j) can be computed as the sum of one entry from each table.

In implementing the process of the present invention, it is preferred to use a computer to perform the various calculations needed to generate output darkness levels U(i,j) corresponding to original color separation values $V_o(s,t)$ for input pixels (s,t). An illustrative software embodiment for performing the method of the present invention is included in an Appendix A to this specification and appears immediately before the claims. In this appended software embodiment of the present invention, the number N of output darkness levels U is 5 for each of the set of output colors comprising cyan, magenta and yellow. This software program is written in the C language for the Sun Sparcstation or the Sun 3/60 Workstation.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A method for producing a multitone reproduction image representative of an original image, comprising the steps of:
   scanning said original image to produce an original image density signal representative of the darkness value $V_o$ of each picture element (s,t) in said original image;
   processing said original image density signal to produce a reproduction image density signal representative of one of N reproduction darkness values $V_r$ for each picture element (i,j) in an array of reproduction picture elements where $V_o(s,t)$ and $V_r(i,j)$ are related by $U(i,j)=(n-1)V_o(s,t)+W(i,j)$ in which U represents a darkness level defined by $U=(N-1)V_r$ and W is a real number in a range $0 \leq W \leq 1$; and
   controlling an image reproduction apparatus, in response to said reproduction image density signal, to produce said multitone reproduction image.

2. The method of claim 1 wherein W(i,j) is selected from a repeating pattern of screen values.

3. The method of claim 2, wherein said repeating pattern includes a unit cell having screen values, in the order provided of 1/16, 9/16, 3/16, 11/16, 5/16, 13/16, 7/16 and 15/16.

4. The method of claim 2, wherein said repeating pattern in each line (i) is offset with respect to adjacent lines (i−1) and (i+1).

5. The method of claim 2, wherein the average screen value of W(i,j) is ½ or about ½.

6. The method of claim 1, wherein the numbers W(i,j) are selected in a random fashion.

7. The method of claim 6, wherein the average screen value of W(i,j) is ½ or about ½.

8. The method of claim 1, wherein said darkness value $V_o$ includes discrete values whose number exceeds N.

9. The method of claim 1, wherein N equals 5.

10. The method of claim 1, further comprising the step of repeating said scanning, processing and controlling steps for a plurality of colors.

11. The method of claim 10, wherein the number N equals 5.

12. The method of claim 1, wherein said real numbers are equally spaced.

13. The method of claim 2, further comprising the step of determining the darkness levels U(i,j) by reference to a look-up table of precalculated values where $V_o(s,t)$ ranges over all possible original values and (i,j) range over one repetition of the pattern of the screen values W(i,j).

14. The method of claim 10, wherein said controlling step includes the step of converting the darkness levels U for said colors to a single palette index P defined by $P(i,j)=(U_cN_m+U_m)N_y+U_y$ where the subscripts c, m and y respectively indicate the colors cyan, magenta and yellow.

15. The method of claim 14, wherein said converting step includes the steps of using look up tables of precalculated values and then summing the values using the equation: $P(i,j)=U_cN_mN_y+U_mN_y+U_y$ where the precalculated values include $U_cN_mN_y$, $U_mN_y+U_y$, and $U_y$ and where $V_o(s,t)$ ranges over all possible original values and (i,j) range over one repetition of the pattern of the screen values W(i,j).

16. The method of claim 1, wherein W(i,j) equals ½.

17. A system for producing a multitone reproduction image representative of an original image, comprising:
   means for scanning said original image to produce an original image density signal representative of the darkness value $V_o$ of each picture element (s,t) of said original image;
   means for processing said original image density signal to produce a reproduction image density signal representative of one of N reproduction darkness values $V_r$ for each picture element (i,j) in an array of reproduction picture elements where $V_o(s,t)$ and $V_r(i,j)$ are related by $U(i,j)=(N-1)V_o(s,t)+W(i,j)$ in which U represents a darkness level defined by $U=(N-1)V_r$ and W is a real number in a range $0 \leq W \leq 1$; and
   an image reproduction apparatus, controlled in response to said reproduction image density signal, to produce said multitone reproduction image.

18. The system of claim 17 wherein said image reproduction apparatus includes a printer.

19. The system of claim 17 wherein said image reproduction apparatus includes a monitor.

* * * * *